Nov. 24, 1953     W. M. CADE ET AL     2,660,444
COUPLING PIN HITCH
Filed March 12, 1951     2 Sheets-Sheet 1
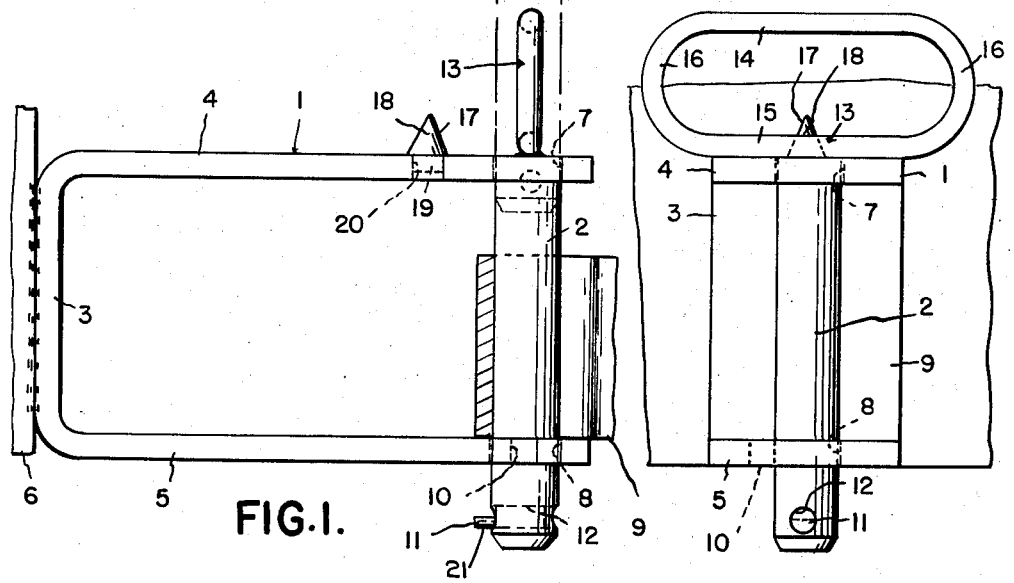
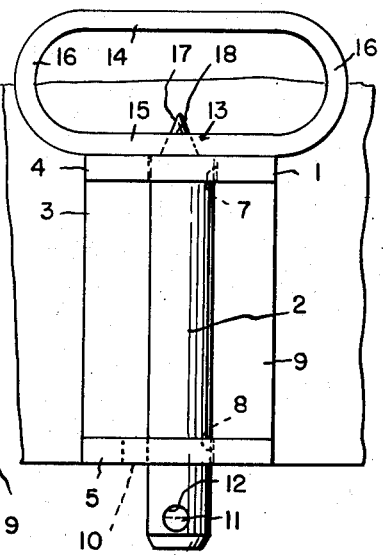
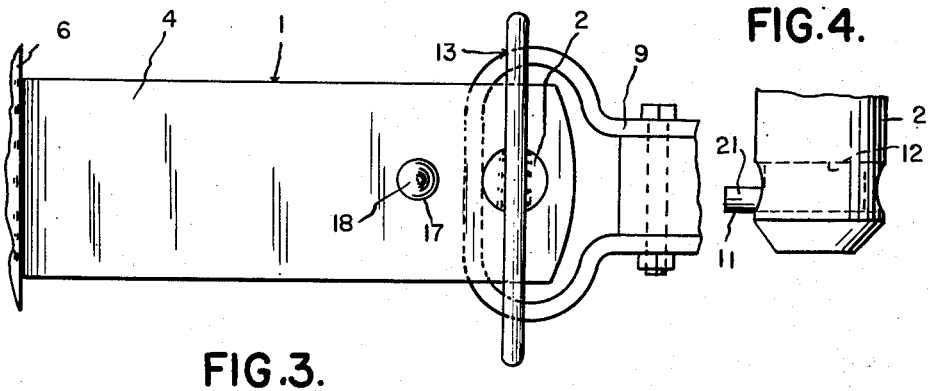
INVENTORS
WILLIAM M. CADE
BY BERT E. DERRY
ATTORNEYS Nov. 24, 1953    W. M. CADE ET AL    2,660,444
COUPLING PIN HITCH
Filed March 12, 1951    2 Sheets-Sheet 2
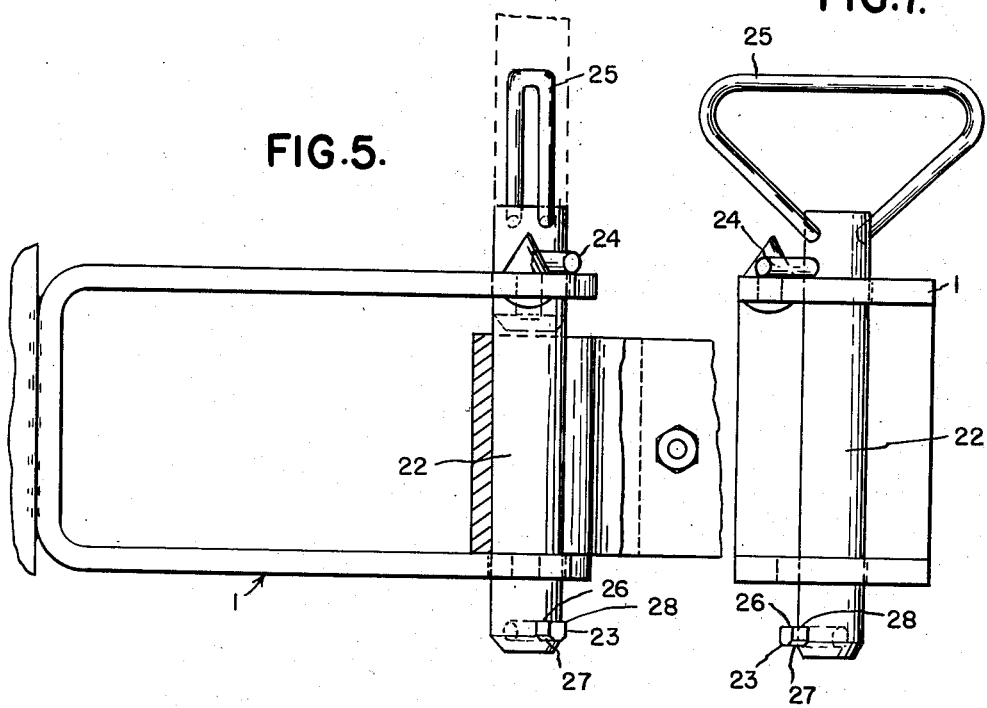
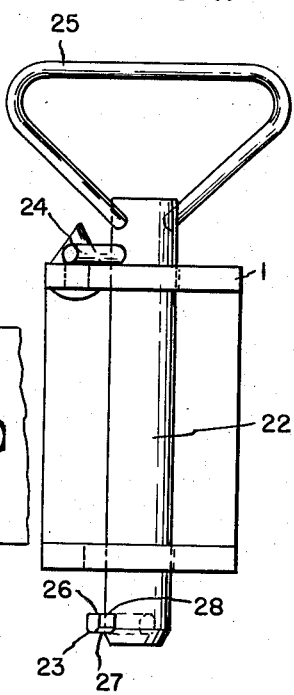
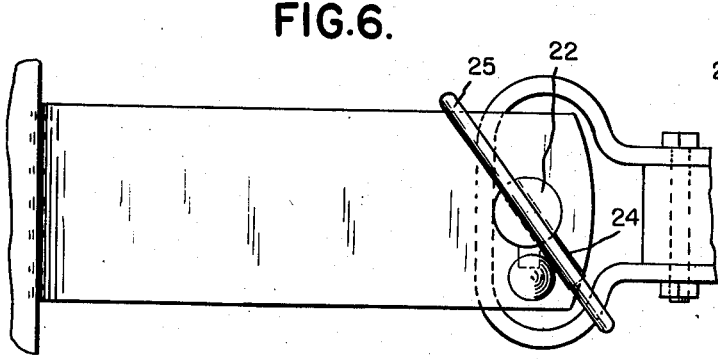
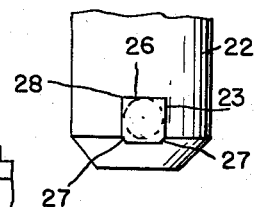
INVENTORS
WILLIAM M. CADE
BY BERT E. DERRY
ATTORNEYS Patented Nov. 24, 1953

2,660,444

UNITED STATES PATENT OFFICE 2,660,444

COUPLING PIN HITCH

William M. Cade and Bert E. Derry, Davenport, Iowa, assignors to Kelsey-Hayes Wheel Company, Detroit, Mich., a corporation of Delaware Application March 12, 1951, Serial No. 215,046

1 Claim. (Cl. 280—33.15)

The invention relates to hitch assemblies and refers more particularly to clevis and pin assemblies for coupling one vehicle to another.

The invention has for one of its objects to provide an improved hitch assembly which is simple in construction and may be economically manufactured.

The invention has for other objects to provide an improved construction of clevis and pin assembly in which the pin may be readily moved by hand to operative and inoperative positions with respect to the clevis; to provide an improved construction of clevis and pin assembly having means for normally retaining the pin in operative position and preventing accidental movement of the pin to inoperative position; to provide an improved construction of clevis and pin assembly in which a part of the means for normally retaining the pin in operative position also serves in holding the pin from being disengaged or separated from the clevis; and to provide an improved construction of clevis and pin assembly having a handle connected to the pin for facilitating its movement and also serving to normally retain the pin in operative position.

With these and other objects in view, the invention resides in the novel features of construction and combinations and arrangements of parts as more fully hereinafter set forth.

In the drawings:

Figure 1 is a side elevation of a hitch assembly embodying the invention;

Figure 2 is an end view thereof;

Figure 3 is a plan view thereof;

Figure 4 is an elevation of the lower end portion of the pin;

Figure 5 is a view similar to Figure 1 showing a modified construction;

Figure 6 is a plan view thereof;

Figure 7 is an elevation of the pin; and

Figure 8 is an elevation of the lower end portion of the pin.

The hitch assembly of Figures 1 to 4 inclusive comprises the clevis 1 and the hitch pin 2. The clevis is preferably formed from flat steel stock and has the base 3 and the upper and lower arms 4 and 5 respectively, the base being permanently secured as by being welded to a part 6 of a tow vehicle such as a tractor. The upper and lower arms have at their free ends the substantially axially aligned circular apertures 7 and 8 respectively for freely slidably receiving the hitch pin 2 which is preferably formed of cylindrical steel stock.

For the purpose of normally retaining the hitch pin in operative position with respect to the clevis at which time the hitch pin extends through the apertures in the upper and lower arms and also through an aperture in the tongue 9 of a vehicle to be coupled to the vehicle having the part 6, the lower arm 5 is formed with the slot 10 extending radially of and opening into the aperture 8 and the hitch pin has permanently secured to its lower end portion the transverse stop pin 11 which extends radially of the hitch pin and is permanently secured in the diametral bore 12 in the hitch pin as by being welded thereto. The stop pin 11 has a diameter slightly less than the width of the slot 10 to freely pass therethrough. Also the hitch pin has permanently secured to its upper end the handle 13 which is formed of steel stock of circular section. The handle has the upper and lower horizontal portions 14 and 15 the latter being preferably welded to the upper end of the hitch pin and also the rounded end portions 16 connecting the upper and lower portions. Furthermore, the upper arm 4 of the clevis has permanently secured thereto the upwardly tapered stop 17 which as shown comprises the conical body 18 and the cylindrical shank 19 which latter extends into the cylindrical aperture 20 in the upper arm and is permanently secured in place as by being welded. The height of the conical body 18 is less than the distance between the lower arm of the clevis and the portion of the stop pin projecting beyond the hitch pin.

The stop 17 is engageable with the handle 13 and more particularly its lower horizontal portion 15 which rests on the upper arm 4 of the clevis in the operative position of the hitch pin and the angular relation of the slot 10 and stop 17 is the same as the angular relation of the stop pin 11 and the handle 13 and more particularly its lower portion 15. More in detail, the angular relation of the radii of the apertures 7 and 8 passing through the middle of the slot 10 and the axis of the stop 17 is the same as the angular relation of the radii of the hitch pin 2 passing through the middle of the stop pin 11 and the middle of the handle 13, and more particularly its lower portion 15. In both cases, the angle between the radii is 90°. As a result, it will be seen that when the hitch pin is in operative position with the lower portion 15 of the handle resting on the upper arm 4 of the clevis, the stop 17 will engage the lower portion of the handle and hold the stop pin 11 from registering with the slot 10, also in order to register the stop pin with the slot the lower portion of the handle must be directly above the apex of the stop 17.

The raising of the hitch pin however can be readily accomplished by hand by effecting a combined raising and rotational movement of the hitch pin through the handle to move the lower portion of the handle directly over the apex of the stop and register the stop pin with the slot after which the hitch pin can be readily moved directly upwardly to clear the lower arm of the clevis and also the tongue.

To facilitate registration of the stop pin 11 with the slot 10 during the lowering of the hitch pin and also to require relatively accurate registration of the stop pin with the slot during the raising of the hitch pin, the portion 21 of the stop pin projecting beyond the hitch pin is semicircular and has a flat horizontal upper face and a semi-circular lower face.

The construction of the clevis and pin assembly shown in Figures 5 to 8 inclusive is very similar to that shown in Figures 1 to 4 inclusive. However, the construction differs essentially in that the hitch pin 22 has permanently secured to its lower and upper end portions the radially extending lower and upper pins 23 and 24 respectively. The lower pin serves as a stop pin while the upper pin in the operative position of the hitch pin rests on the upper arm of the clevis and is engageable with the upwardly tapered stop secured to the upper arm. In this case the handle 25 is secured to the upper end portion of the hitch pin above the pin 24 preferably by being welded thereto. Also, the portion 26 of the stop pin 23 which projects beyond the hitch pin has its lower corners 27 beveled and its upper corners 28 square to facilitate registration of the projecting portion of the stop pin with the slot in the lower arm of the clevis during lowering of the hitch pin and require relatively accurate registration of the projecting portion with the slot during raising movement of the hitch pin to inoperative position.

What we claim as our invention is:

A hitch assembly comprising a clevis having upper and lower arms, each arm having an aperture therein, said apertures being in vertical alignment, the lower of said apertures having a radial slot opening thereinto, a hitch pin extending through said apertures, said hitch pin having a radial stop pin fixed thereto and adapted to pass through said slot, said stop pin having a flat upper face requiring accurate registration of the stop pin with the slot during raising of the hitch pin and upwardly diverging lower face portions to facilitate registration of the stop pin with the slot during lowering of the hitch pin, an upwardly tapered stop member on the upper side of said upper arm, and a handle attached to said hitch pin, said handle having a portion positioned above said stop member to permit lifting and rotation of said hitch pin and another portion resting on said upper arm, said latter portion being engageable with said stop member to prevent rotation of said hitch pin and registration of said stop pin with said slot, said stop member, stop pin, latter portion, and slot being so related that said stop pin can be passed through said slot only when said latter portion is in vertical alignment with said stop member.

WILLIAM M. CADE.
BERT E. DERRY.

References Cited in the file of this patent

UNITED STATES PATENTS

| Number | Name | Date |
|---|---|---|
| 437,388 | Wooster | Sept. 30, 1890 |
| 565,513 | Schuler | Aug. 11, 1896 |